United States Patent
Gedig et al.

(10) Patent No.: US 11,602,748 B2
(45) Date of Patent: Mar. 14, 2023

(54) FLOW CELL FOR THE SELECTIVE ENRICHMENT OF TARGET PARTICLES OR CELLS

(71) Applicant: Xantec Bioanalytics GmbH, Düsseldorf (DE)

(72) Inventors: Erk Tjalling Gedig, Düsseldorf (DE); Melanie Dieckmann, Steinfurt (DE)

(73) Assignee: Xantec Bioanalytics GmbH, Düsseldorf (DE)

( * ) Notice: Subject to any disclaimer, the term of this patent is extended or adjusted under 35 U.S.C. 154(b) by 100 days.

(21) Appl. No.: 16/626,712

(22) PCT Filed: Aug. 20, 2018

(86) PCT No.: PCT/EP2018/072462
§ 371 (c)(1),
(2) Date: Dec. 26, 2019

(87) PCT Pub. No.: WO2019/034795
PCT Pub. Date: Feb. 21, 2019

(65) Prior Publication Data
US 2020/0164376 A1    May 28, 2020

(30) Foreign Application Priority Data
Aug. 18, 2017 (EP) .................................... 17186963

(51) Int. Cl.
*B01L 3/00* (2006.01)
*B01F 25/433* (2022.01)
(Continued)

(52) U.S. Cl.
CPC .... *B01L 3/502761* (2013.01); *B01F 25/4331* (2022.01); *B01F 25/4332* (2022.01);
(Continued)

(58) Field of Classification Search
CPC . B01L 3/5027; B01L 3/502761; B01F 5/0647
See application file for complete search history.

(56) References Cited

U.S. PATENT DOCUMENTS

| | | | |
|---|---|---|---|
| 6,361,958 B1 * | 3/2002 | Shieh | B01L 7/525 436/514 |
| 2009/0117579 A1 | 5/2009 | Long et al. | |

(Continued)

FOREIGN PATENT DOCUMENTS

| | | |
|---|---|---|
| EP | 2542689 | 1/2013 |
| WO | 2002010759 | 2/2002 |
| WO | 2016019401 | 2/2016 |

OTHER PUBLICATIONS

International Search Report and Written Opinion in corresponding PCT/EP2018/072462, dated Sep. 10, 2018.
(Continued)

*Primary Examiner* — Brian J. Sines
(74) *Attorney, Agent, or Firm* — Hovey Williams LLP

(57) ABSTRACT

The present invention relates to the field of micro fluidics. Specifically, the present invention relates to a novel flow cell for the selective enrichment of target particles or cells from a fluid. The flow cell exhibits a novel design which greatly improves the target particle or cell yield. The invention also provides a micro fluidic device, comprising the flow cell according to the invention. In another aspect, the invention relates to the use of a flow cell or a micro fluidic device of the invention for the isolation of target particles or cells from a fluid sample. Finally, the invention relates to a method for the selective enrichment of target particles or cells from a fluid using the flow cell of the invention.

13 Claims, 6 Drawing Sheets

(51) Int. Cl.
    *B01F 33/30*         (2022.01)
    *B01F 35/512*       (2022.01)
    *B01F 101/00*      (2022.01)

(52) U.S. Cl.
    CPC ............ *B01F 33/30* (2022.01); *B01F 35/512* (2022.01); *B01F 2101/2202* (2022.01); *B01L 2200/0652* (2013.01); *B01L 2200/0668* (2013.01); *B01L 2300/0681* (2013.01); *B01L 2300/0877* (2013.01); *B01L 2300/0883* (2013.01); *B01L 2300/12* (2013.01)

(56) References Cited

U.S. PATENT DOCUMENTS

| | | |
|---|---|---|
| 2011/0158852 A1 | 6/2011 | Castro et al. |
| 2013/0302814 A1 | 11/2013 | Haydock |
| 2016/0167047 A1* | 6/2016 | Weber ............... B01L 3/502707 422/561 |
| 2018/0106805 A1* | 4/2018 | Allen ................ B01L 3/502761 |

OTHER PUBLICATIONS

Pantel, et al., "Detection, clinical relevance and specific biological properties of disseminating tumour cells", Nature, May 2008, vol. 8, pp. 329-340.

Pantel, et al., "Cancer micrometastases", Nature Reviews, Jun. 2009, vol. 6, pp. 339-351.

* cited by examiner

FLOW CELL FOR THE SELECTIVE ENRICHMENT OF TARGET PARTICLES OR CELLS

RELATED APPLICATIONS

This application is the U.S. National Stage of International Patent Application No. PCT/EP2018/072462, filed Aug. 20, 2018, which is hereby incorporated by reference in its entirety, and which claims priority to European Patent Application No. 17186963.9, filed Aug. 18, 2017.

FIELD OF THE INVENTION

The present invention relates to the field of microfluidics. Specifically, the present invention relates to a novel flow cell for the selective enrichment of target particles or cells from a fluid. The flow cell exhibits a novel design which greatly improves the target particle or cell yield. The invention also provides a microfluidic device, comprising the flow cell according to the invention. In another aspect, the invention relates to the use of a flow cell or a microfluidic device of the invention for the isolation of target particles or cells from a fluid sample. Finally, the invention relates to a method for the selective enrichment of target particles or cells from a fluid using the flow cell of the invention.

BACKGROUND OF THE INVENTION

The reliable detection of rare cells in liquids is important in different practical fields. For example, the detection and quantification of pathogenic bacteria in drinking water is of utmost importance. Another example is the detection of circulating tumor cells (CTCs) in blood, which has become an important tool in the field of monitoring and controlling a tumor disease. Tumor cells that disseminate from the primary tumor and circulate into the blood pose a high risk for patients affected with cancer, such as breast cancer, since these cells can form metastases. Accordingly, the detection of circulating tumor cells in blood is of importance for determining the prognosis after cancer diagnosis, evaluating the risk of metastases as well as therapeutic monitoring.

However, the detection of CTCs is technically challenging, since the concentration of these cells in the blood is extremely low so that an initial enrichment or isolation of the cells becomes necessary. Meanwhile, several immunocytochemical methods for the separation and enrichment have been established for the isolation of CTCs from blood. For example, magnetic particles, which have been derivatized with antibodies directed against tumor-specific cell surface antigens, are used to separate tumor cells or clusters of tumor cells from blood samples. However, established systems are not sufficiently selective and thus regularly exhibit unspecific cell binding. Further, the systems known in the art are expensive and their use is often time-consuming.

Apart from immunocytochemical enrichment methods, so-called microfluidic systems have been developed for the detection of particles or cells in fluids. These systems comprise a glass or polymer flow cell having microchannels etched or molded into the flow cell material. Fluids containing the particles or cells of interest are conducted through the channels and trapped by surfaces that have been derivatized with molecules that exhibit specificity for the particles or cells. It has been found, however, that when being conducted through microfluidic flow cells or devices, cells follow streamlines with minimal molecular diffusion across flow channels. The resulting lack of mixing reduces the number of interactions between the cells or particles and the derivatized trapping surfaces, thereby leading to low capture efficiency. Thus, an effective mixing of the laminar uniaxial flow of the fluid is essential for the separation of particles or cells in a flow-through system. The mixing provides an improved contact between the particles or the cells and the surfaces of the flow cell.

For this purpose, the microchannels within a flow cell are often equipped with barrier elements that interfere with the straight flow, thereby producing an overturn of the flow. For example, micro fluidic systems comprising microcolumns have been developed that cause a defined deflection of the laminar flow. The so-called "CTC-Chip" (Nagrath et al. 2007) uses approximately 78,000 microcolumns that interfere with the laminar flow and at the same time expand the surface of the chips considerably. The surface of the CTC-Chip is chemically functionalized by anti-EpCAM antibodies to catch tumor cells upon contact with the surface. This system can be operated with a maximum flow rate of 1-2 ml/h and reaches a catching efficiency of 60-65%.

Similarly, Sheng et al. (2012) uses a microfluidic system comprising about 59,000 columns per channel. Instead of the antibodies mentioned above, immobilized tumor cell-specific aptamers are coated on the microcolumns, i.e. single-stranded DNA oligonucleotides that bind to surface structures of tumor cells. Using this system in a microchannel of 40 μm height with a whole blood sample having a flow rate of 600 nl/s, a catching efficiency of tumor cells of >95% has been achieved. 1 ml whole blood was processed in 28 minutes. The subsequent detection of caught particles or cells by means of optical detection systems is difficult in systems comprising microcolumns since it is a three dimensional system and the cells are not present on the same level of focus.

Apart from the microcolumns mentioned above, so-called fishbone structures were used, e.g. in the "herringbone chip" (Stott et al. 2010). The chip comprises eight microchannels containing fishbone structures on their surfaces. All internal walls of the channels are coated with anti-EpCAM antibodies. According to the authors, the fishbone structures induce a swirl in the laminar flow that increases the cell-surface-interactions in the system. However, in microfluidic systems of this miniaturization degree, a swirl cannot occur because of the low Reynolds number in aqueous systems, so that the flow in these systems is actually laminar. A catching efficiency of 91.8%±5.2% (n=6) for the tumor cell line PC-3 was achieved with this chip using a flow rate of 1.2 ml/h.

Additionally, sinus-shaped microchannels were used in which the cells are transported to the channel walls by centrifugal force (Adams et al. 2008, Kamande et al. 2013). The width of these walls varies depending on the application, thereby precluding a standardization of such a system. Warkiani et al. (2013) use a trapezoidal microchannel in which target cells flow towards the channel's outer walls.

With the flow cell systems described above, various particles or cells, as e.g. thrombocytes, macrophages, circulating tumor cells, erythrocytes, leucocytes etc., can be separated selectively from whole blood samples and captured on derivatized surfaces. However, the systems have relatively long separation times and are thus only useful for processing a small sample volume. Additionally, none of the systems is capable of effectively increasing the number of particles-surface-contacts. In addition, the barrier elements integrated on the chip or flow cell surface impede the automated optical detection and evaluation excessively or even make them impossible. Hence, there is a need for new microfluidic systems that can overcome the disadvantages of the currently employed systems.

The present invention provides a microfluidic flow cell with a novel architecture that overcomes the above disadvantages and provides for an improved particle or cell yield. In particular, the invention relates to a microfluidic flow cell for the selective enrichment or isolation of target particles or target cells from a fluid. The flow cell comprises a top portion and a bottom portion which are intermateable to form at least one meander-shaped flow channel for conducting the fluid through the flow cell. Preferably, the flow channel is recessed into the top portion of the flow cell, e.g. by etching or cutting, wherein the surface of the bottom portion of the flow cell forms the bottom plate of the flow channel after fitting the two parts of the flow cell into each other. The meander-shaped flow channel is defined by a plurality of spaced interior wall portions alternatingly extending from opposite sides of the flow cell.

Exemplary embodiments of the flow channel are depicted in FIGS. 2A, 2B and 2C. In these schematic depictions, the top portion of a flow cell is shown with the flow channel being recessed into the top portion. The flow channel recessed in the top portion of the flow cell has a meander-shaped pattern which means that the flow channel is shaped such that the flow of a fluid flowing though the channel is reversed several times along the spatial extension of the channel. Preferably, the flow channel is S-shaped or sinus-shaped so as to change the direction of the flow one or more times by essentially 180 degrees, i.e. a complete reversion of the direction of the flow. As a result, a fluid stream conducted through the channel changes its direction when flowing through adjacent sections of the channel. More particularly, the fluid stream changes its direction when it flows around one of the interior wall portions that extend from both sides of the flow cell. Exemplary embodiments of the flow channel are depicted in FIGS. 2A, 2B and 2. In these schematic depictions, the top portion of a flow cell is shown wherein the flow channel is recessed into the top portion. The flow channel recessed in the top portion of the flow cell has a meander-shaped pattern which means that the flow channel is shaped such that the flow of a fluid flowing though the channel is reversed several times along the spatial extension of the channel. Preferably, the flow channel is S-shaped or sinus-shaped so as to change the direction of the flow one or more times by essentially 180 degrees, i.e. a complete reversion of the direction of the flow. As a result, a fluid stream conducted through the channel changes its direction when flowing through adjacent sections of the channel. More particularly, the fluid stream changes its direction when it flows around one of the interior wall portions that extend from both sides of the flow cell.

The flow channel also comprises at least one surface which is coated with molecules having affinity for the target particles or cells, e.g. antibodies or aptamers which are directed to surface structures of target cells. Preferably, the bottom portion of the flow cell which forms the bottom plate of the flow channel is coated. This has the particular advantage that gravity aids in forcing the cells and particles to the coated capture surface. It is however also possible that more than one inner surface that is coated with affinity molecules.

According to the invention, it has been found that the efficiency of target cell or particle enrichment can be enhanced by modifying the wall portions that define the flow channel within the flow cell. In particular, at least one and preferably all of the interior wall portions that provide for the barriers to redirect the fluid flow comprises at least one opening to allow a portion of a fluid stream flowing through the flow channel to traverse the respective wall portions while the remaining portion of the fluid stream flows around the wall portion. These openings preferably have the form of recesses or slits. More preferably, all of the wall portions comprise at least one such opening. The openings have dimensions to allow part of the fluid conducted through the flow channel to traverse the wall portions. This means that upon contact of the fluid that contains the target cells or particles with a wall portion, the fluid is divided in two sub-streams such that a first fluid stream is generated that traverses the wall portion through the opening of the wall portion, thereby flowing directly in the direction of the pressure gradient that exists along the channel expansion. At the same time, a second fluid stream is generated which is deflected by the wall portion so that it is redirected to flow around said wall portion. When the two streams merge again after having passed the wall portion, a helical convection is generated which rapidly transports the particles or cells that are present in the fluid to the coated capture surface. Preferably, the coated capture surface is formed by the bottom portion of the flow cell.

The top portion and/or the bottom portion of the flow cell of the invention may consist of glass, plastic, silicon or a polymeric material such as polydimethylsiloxane (PDMS). Preferably, the material selected for the top portion and/or the bottom portion of the flow cell is translucent and has a low auto fluorescence so as to allow the optical detection of the captured cells by fluorescence microscopy. In one preferred embodiment, the top portion is made of one of those materials. In another preferred embodiment, the bottom portion is made of one of those materials. In yet another preferred embodiment, the top portion and the bottom portion are both made of one of those materials. Most preferably, the top portion and the bottom portion are made of the same material. In a preferred embodiment of the invention, top portion and/or the bottom portion consist of a plastic that can be processed by injection molding. This allows the flow cell to be fabricated by injection molding which greatly reduces the costs for producing the flow cell.

The microfluidic flow cell comprises at least one flow channel, but it preferably comprises more than one flow channel. In a preferred embodiment, the microfluidic flow cell comprises 2-100 flow channels, 2-50 flow channels or 2-10 flow channels. The channels are preferably arranged in parallel. It is also preferred that all channels are in the same plane. The flow cell will normally further comprise at least one inlet and at least one outlet with the flow channel(s) being located between the inlet and outlet. Each flow channel is in contact with the inlet of the flow cell such that fluid can be pumped into the flow cell via the inlet, enters the flow channel which is in fluid contact with the inlet, and can leave the flow cell via the outlet after it has flown through the flow channel.

According to the invention, at least one of the flow channels, and preferably all flow channels, provide for a multiple redirection of the fluid which is conducted through the flow channel. The direction of the flow channels is defined by interior wall portions which alternatingly extend from opposite sides of the flow cell. These alternatingly extending interior wall portions can be easily produced, e.g. by etching or cutting a S-shaped flow channel into a solid block of a suitable material such as PDMS which then forms the top portion of the flow cell.

The interior wall portions that provide for the redirection of the flow may have different geometries, and in a preferred embodiment these wall portions are planar strips or projections. The number of alternatingly extending wall portions in the top portion of a single flow cell can range from about 10-1000, preferably from about 50-500, such as from about 200-400. By such arrangements, a fluid stream flowing through the flow channel is forced to flow around the extending wall portions, thereby changing the direction of the flow several times. Preferably, the direction of the flow is changed by at least about 90 degrees, about 100 degrees, about 110 degrees, about 120 degrees, about 130 degrees, about 140 degrees, about 150 degrees, about 160 degrees, about 170 degrees, or about 180 degrees. This architecture induces an essentially S-shaped flow pattern within the flow channel, which means that the fluid repeatedly flows through the flow channel in the form of an essentially sinus- or s-shaped curve.

The flow channel preferably has a width between about 0.4 and about 2.0 mm, more preferably between about 0.6 and about 2.0 mm, and even more preferably between about 0.9 and about 1.8 mm. As used herein, the width of the flow channel is defined as the space between the two side walls of the flow channel. Further, the channel has a height between about 10 and about 400 µm, such as between about 100 and about 200 µm. As used herein, the height of the flow channel is defined as the space between the upper channel wall which is formed by the top portion, and the lower channel wall which is formed by the bottom portion of the flow channel. The extending wall portions may have a width of between about 0.1 and about 1.0 mm, more preferably between about 0.6 and about 0.8 mm, and even more preferably between about 0.3 and about 0.6 mm. In a particularly preferred embodiment of the invention, the flow cell comprises 10-50 flow channels, each of which having a width between about 100 and about 200 µm, a height between about 100 and about 200 µm, and each comprising extending wall portions with a width of between 0.6 and about 0.8 mm.

As mentioned above, the wall portions comprise openings which allow part of the fluid to pass through the wall portions without flowing around them. Preferably, the opening is a slit or recess that is formed in the wall portion. The slit or recess can be located anywhere in the wall portion, but preferably it is located in the vicinity of the capture surface, e.g. in the part of the wall portion that is adjacent to the bottom part of the flow cell. In a preferred embodiment, the recess is a gap between the lower rim of the wall portion and the bottom portion of the flow cell, i.e. the wall portion is not in contact with the bottom portion of the flow cell, but instead has a recess which extends over part of or the complete width of the wall portion.

Where the flow channel has a width of less than 1.3 mm, the slit or recess may have a width of about 10-100 µm, preferably about 20-60 µm, more preferably about 20-40 µm. Where the flow channel has a width of more than 1.3 mm, the slit or recess may have a width of about 10-100 µm, preferably about 20-70 µm, more preferably about 20-50 µm.

As regards the overall dimensions of the microfluidic flow cell, it will normally have a width of ≤2 cm, such as about 0.5 cm, about 1.0 cm, or about 1.5 cm. Preferably, the microfluidic flow cell of the invention has a width of between about 0.5 and 2.0 cm, more preferably between 1.5 and 2.0 cm. The microfluidic flow cell will normally have a length of ≤5 cm long, such as about 1.0 cm, about 2.0 cm, about 3.0 cm, about 4.0 cm, or about 5.0 cm. Preferably, the microfluidic flow cell of the invention has a length of between about 1.0 and 5.0 cm, more preferably between 2.0 and 4.0 cm.

The at least one flow channel comprises at least one surface which has a coating that has specific affinity for the particles or cells to be enriched. This surface, which is referred to as "capture surface" herein, preferably is at the bottom of the microfluidic flow cell such that gravity can direct the particles or cells to be enriched or isolated towards the capture surface. However, it can also be located at the side walls of the channel. Alternatively, it is also possible that all walls of the one or more channels are coated with the affinity coating. The coating comprises at least one type of affinity molecule which is suitable to selectively bind to a predetermined structure on the target particle or cell.

According to a particularly preferred aspect, the capture surface comprising the affinity molecules is coated with a natural or synthetic hydrophilic polymer layer. Preferably, the hydrophilic polymers form a three-dimensional structure on the support material which is highly hydrated. Accordingly, such polymer network is often referred to as "hydrogel". A hydrogel can contain up to 99% or more water, whereas the polymer content can be 1% or even less. Methods for preparing hydrogels for use in the present invention are described, for example, in WO 02/10759. This international application, which is incorporated herein in its entirety, describes the use of adhesion mediator layers which provide for the coupling of the hydrogel polymers to the support material. The hydrogel coatings provided in WO 02/10759 are particularly preferred for use in the method of the present invention.

Various hydrophilic polymers can be used for the hydrogel coating. For example, the coating may comprise or consist of polysaccharides, polyalcohols, polyethers, polyamides, polycarboxylic acids, polysulfates, polysulfonates, polyphosphates, polyphosphonates and/or combinations or functionalized derivatives thereof. Such functionalizations include, for example, isothiocyanates, isocyanates, carboxylic acid azides, N-hydroxysuccinimides, sulfo-N-hydroxysuccinimides, Nacylimidazoles, sulfonylchloride derivatives, aldehyde, keto, glyoxal, oxirane, carbonate, arylhalogenide, imidoesters, anhydrides, halogenalkyls, halogenacyls, maleimides, aziridines, acryloyls, sulfhydryls, disulfides, diazoalkanes, diazoacetyls, imidazolylcarbamates, hydrazides, diazo, arylazides, benzophenones, diazopyruvates or diazirines. A further preferred functionalization involves nitrilotriacetic acid (NTA) derivates, so that ligands or antibodies can be immobilized by means of a metal chelate. Steptavidin and/or biotin derivatives are also suitable for functionalization. According to a preferred embodiment, the hydrogel coating comprises or consists of polycarboxylate polymers. According to a further preferred embodiment, the hydrogel coating has a slightly negative charge, as measured, for example, by Zeta potential determination.

The hydrogel coating can be of any thickness which allows for the capture of the target particle or cells on the surface of the hydrogel. Preferably, the hydrogel coating has a thickness of between about 100 nm and about 5000 nm, preferably between about 500 nm and about 3000 nm, for example, about 600 nm, about 700 nm, about 800 nm, about 900 nm, about 1000 nm, about 1100 nm, about 1200 nm, about 1300 nm, about 1400 nm, about 1500 nm, about 1600 nm, about 1700 nm, about 1800 nm, or about 1900 nm. The thickness of the coating can be determined by routine methods available in the prior art, for example, by atomic force microscopy or ellipsometry.

The coating preferably provides a three-dimensional surface structure in which the chains of the hydrophilic polymer are aligned at least partly vertical to the substrate surface, i.e.

brush-like. Due to their increased surface compared to planar structures, such brush-like hydrogel surfaces show a particularly enhanced immobilization capacity for biomolecules, such as antibodies and other affinity molecules which are capable of binding the target particles or cells. It has been found that brush-like structured hydrogel coatings, in particular those which comprise or consist of certain polycarboxylate polymers, provide an excellent surface for selectively attaching cells to a solid support for subsequent detection and/or quantification. Preferred hydrogel surfaces for use in the present invention are available, for example, as HC or HCX coated slides from XanTec bioanalytics GmbH, Dusseldorf, Germany.

According to the present invention, the capture surface comprises one or more different types of affinity molecules which selectively bind to the target cells in the sample, thereby allowing the separation of the target particles or cells from any other particles or cells present in the fluid. The "affinity molecules" are broadly understood as molecules which bind to predetermined structures of the particles or cells, preferably to protein or saccharide structures which are present on the surface of cells. The affinity molecules are preferably protein molecules, such as receptors, lectins, ligands, antibodies, antibody fragments, nucleic acids (such as aptamers), saccharide structures, or combinations thereof. In a particularly preferred aspect, the affinity molecules are antibodies, such as antibodies directed against cancer antigens.

When the isolation of cells is desired, the use of antibody molecules or antigen-binding fragments of antibodies is particularly preferred. Thus, in a preferred embodiment, the coating on the capture surface of the microfluidic flow cell of the invention comprises antibodies, preferably antibodies that specifically bind to tumor cells. In the context of the present invention, the term "antibody" includes monoclonal antibodies, polyclonal antibodies, multispecific antibodies (for example, bispecific antibodies), anti-idiotypic antibodies, chimeric antibodies, and humanized antibodies, as long as they exhibit the desired immunological activity, i.e. specific binding to the target cells. In particular, the term is to be understood as comprising any kind of artificial antibody molecule that was prepared by grafting techniques and the like. The antibodies for use in the present method may be of any isotype class, such as IgG, IgM, IgA, IgE, and IgD as well as their subclasses, e.g., IgG1, IgG2 and the like.

Apart from whole antibodies, the present invention also refers to antigen-binding fragments of an antibody which specifically bind to the target cell. As used herein, an antigen-binding fragment of an antibody is a fragment which retains at least a part of the specific binding activity of the whole antibody molecule for the particular antigenic structure of the target cell, e.g. a disseminated tumor cell. Antigen-binding fragments of the invention may comprise Fv, Fab, F(ab') and F(ab')$_2$ fragments. Further included by the term "antigen-binding fragment" are single chain Fv antibody fragments and disulfide-linked Fv fragments (dsFv). Methods for the recombinant production of antibody fragments have been described in the prior art and comprise, for example, techniques such as phage display or ribosome display. The recombinant antibody fragments produced by these methods may be purified and tested for binding affinity and specificity to the target cells, for example, tumor cells.

The immobilization of specific affinity molecules to a capture surface can be done in different ways. In cases where the capture surface is a solid support such as a glass slide, aminosilylation of the glass surface can be used. Where the capture surface comprises a hydrogel covalent coupling of the affinity molecules via amino or hydroxyl functionalities to a hydrogel pre-activated with N-hydroxysuccinimide (NHS) can be used. As the immobilized affinity molecules are covalently bound to the hydrogel coating rather than adsorbed, the immobilization process is equally well suited for all kinds of affinity molecules, for example, antibodies, proteins, peptides, compounds with a low molecular weight, nucleic acids, and the like, as long as these affinity molecules bear suitable reactive groups, such as amino, (di)sulfide or aldehyde moieties. For alternative coupling strategies, streptavidin, protein A, disulfide or hydrazide functionalized coatings are likewise available in the prior art. The buffers containing the affinity molecule can be either applied to the entire capture surface or spotted onto defined regions of said surface. It is readily possible to combine different affinity molecules on one substrate. In a preferred embodiment, the hydrogel-coated capture surface comprises 2 or more affinity molecules having different binding specificities, such as 2, 3, 4, or 5 different antibodies.

The capture surface of the invention can of course also comprise different types of affinity molecules, such as different antibodies or antibody fragments which are directed against the same or different antigenic structures of the same target cell. Alternatively, where the simultaneous enrichment of different types of target cells is desired within the same process, the capture surfaces can also comprise different antibodies or antibody fragments which are directed against different target cells. Preferably, the overall density of affinity molecules on the capture surfaces of the invention is in the range of about 0.1 to about 100 ng/mm$^2$, for example, about 0.5 ng/mm$^2$, about 1 ng/mm$^2$, about 5 ng/mm$^2$, about 8 ng/mm$^2$, about 10 ng/mm$^2$, about 15 ng/mm$^2$, about 20 ng/mm$^2$, about 30 ng/mm$^2$, about 40 ng/mm$^2$, about 50 ng/mm$^2$, about 60 ng/mm$^2$, about 70 ng/mm$^2$, about 80 ng/mm$^2$, about 90 ng/mm$^2$, about 100 ng/mm$^2$ or even higher densities. It is particularly preferred that the above densities refer to affinity molecules which are antibodies or antibody fragments. It is also preferred that the binding capacities of the affinity molecules which are immobilized on the capture surface are not substantially affected by the coupling process. After immobilization to the capture surface, the affinity molecules, e.g. the antibodies or antibody fragments, retain more than 50%, preferably more than 60%, more than 70%, more than 80%, more than 90%, and more preferably more than 95% of their original binding capacity for the target molecule, i.e. the binding capacity for the target without immobilization.

The affinity molecules of the present invention, e.g. the antibodies or the antigen-binding fragments derived therefrom, are selected based on their capacity to exhibit selective binding to the target cells, e.g. to tumor cells. As used herein, selective binding means that the affinity molecule binds to the target cell at least about 4-fold stronger, usually more than about 5-fold stronger, more than about 6-fold, more than about 8-fold, more than about 10-fold, more than about 15-fold, more than about 20-fold, more than about 50-fold, or even more than about 100-fold stronger relative to the binding to a non-target cell in the sample, as reflected, for example, by the $K_D$ value of the affinity molecule/target ligand pair. For example, when using a whole blood sample in the method of the invention, the affinity molecule should not exhibit any substantial binding to leukocytes which are present in the filtrate.

In a further aspect, the affinity molecules on the capture surfaces can be receptors, lectins, ligands or functional portions thereof. In addition, affinity molecules with a low affinity to structures on the target cells can be employed.

Although one interaction alone will generally not be stable enough for a separation process, the cooperative effect of several weak interactions distributed over the contact area of one cell with the capture surface results in a sufficiently strong and specific interaction. This is a significant advantage over state of the art nanoparticles-based techniques, as the relatively small surface area of those particles is too small to allow for such a cooperative mechanism.

In a preferred embodiment, the target cells to be enriched and/or isolated are disseminated tumor cells which are bound to the capture surface in the channel, for example, a hydrogel-coated surface, via antibodies or fragments thereof which have a specific binding affinity for cell surface marker of these tumor cells. Suitable surface marker of disseminated tumor cells are well known in the art and include the epidermal growth factor receptor (EGFR), the epithelial cell adhesion molecule (EpCAM or CD326), the insulin growth factor-1 receptor (IGF-1R), the epidermal growth factor receptor 2 (Her2), cytokeratin 19 (CK19), cytokeratin 20 (CK20), mucin 1 (MUC1), mucin 2 (MUC2), human Epithelial Membrane Antigen (EMA), epithelial antigen (Ber-EP4), and/or folate receptor alpha (FRalpha). Further markers are discussed extensively in the literature, see, for example, Pantel et al. (2008), Nature Reviews, 8, 1-12; Pantel et al. (2009), Nat Rev Clin Oncol., 6(6):339-51.

Accordingly, antibodies for use as affinity molecules in the coatings of the microfluidic flow cell may comprise an anti-EpCAM antibody, such as antibody clone 323A3 (available from Kamiya Biomedical Company, Seattle, USA), antibody clone MK-1-25 (available from Acris, Herford, Germany), antibody clone AUA1 (available from Novus Biologicals, Littleton, USA), antibody clone 158206 (available from R'n'D Systems GmbH, Wiesbaden, Germany), antibody clone 528 (available from Santa Cruz Biotechnology Inc., Heidelberg, Germany), an anti-IGF-1R antibody, such as CP-751,871 (available from Pfizer Pharma AG, Berlin, Germany), an anti-CD19 antibody, such as those available from Santa Cruz Biotechnology Inc., Heidelberg, Germany referred to as catalogue numbers sc-70563, sc-18895, sc-70560, sc-70559, sc-70561, sc-21714, sc-65295, sc-52311, sc-69736, sc-65255, sc-8498, sc-52378, sc-20922, sc-18884, sc-18894, sc-19650, sc-51529, sc-8500-R, sc-13507, sc-53191, sc-8499, sc-18896 and sc-69735; an anti-MUC1 antibody, such as those available from Santa Cruz Biotechnology Inc., Heidelberg, Germany referred to as catalogue numbers sc-71611, sc-71610, sc-71612, sc-71613, sc-59931, sc-71614, sc-59794, sc-59795, sc-59796, sc-59797, sc-52347, sc-6827, sc-53376, sc-59798, sc-52085, sc-59799, sc-53377, sc-6826, sc-59793, sc-59800, sc-15333, sc-25274, sc-53379, sc-52086, sc-52087, sc-52088, sc-52089, sc-52090, sc-52091, sc-52092, sc-52093, sc-6825, sc-53380, sc-73595, sc-53381, sc-56441, sc-65589, sc-65220, sc-69644, sc-73606, sc-80889, sc-73605, sc-7313, and sc-52094; an anti-MUC2 antibody, such as those available from Santa Cruz Biotechnology Inc., Heidelberg, Germany referred to as catalogue numbers sc-59859, sc-7314, sc-15334, sc-23170, sc-23171, and sc-13312; an antiCK19 antibody, such as those available from Santa Cruz Biotechnology Inc., Heidelberg, Germany referred to as catalogue numbers sc-53258, sc-53257, sc-33110, sc-33120, sc-25724, sc-33111, sc-33119, sc-53003, and sc-56371; an anti-CK20 antibody, such as those available from Santa Cruz Biotechnology Inc., Heidelberg, Germany referred to as catalogue numbers sc-25725, sc-17112, sc-52320, sc-70918, sc-56522, sc-56372 and sc-58730; an anti-epithelial membrane antigen antibody, such as clone E29 of Dako Deutschland GmbH, Hamburg, Germany; an anti-epithelial antigen antibody, such as clone Ber-EP4 of Dako Deutschland GmbH, Hamburg, Germany; an anti-egfr antibody, such as sc-120 available from Santa Cruz Biotechnology Inc., Heidelberg, Germany. Further suitable antibodies are, for example, antibody VU-1D9 from Novocastra Deutschland, Berlin, Germany; antibody Ks5+ 8.22/C22 from Progen Biotechnik GmbH, Heidelberg Germany; antibody A45-BB3-Cy3 from Micromet, Munich, Germany; antibody Mov18/Zel from Enzo Life Sciences GmbH, Lorrach, Germany. The invention also contemplates the use of antigen-binding fragments of any of the above antibodies.

The fluid which comprises the particles or cells to be isolated preferably is a liquid, but it may also be a gas. Preferably, the fluid is a body fluid or a tissue extract from an individual. Preferably, the individual from which the sample is derived is a vertebrate, and more preferably, a mammal. In a particularly preferred embodiment, the sample is derived from a human. The fluid will normally be a cell suspension. The sample can comprise or consist of blood (e.g. whole blood) or blood components, urine, pleural effusions, ascites, bronchoalveolar lavage, nipple aspirate of the glandular of the female breast or bone marrow. In a preferred aspect, the sample comprising the target cells is a blood or bone marrow sample, e.g. a sample from a human individual comprising or mainly consisting of blood or bone marrow, respectively. The sample can be taken by any suitable method known in the prior art. For example, if the sample is a human blood sample, it can be taken by vein puncture. Methods for obtaining bone marrow, e.g. human bone marrow, are also well known in the art. For example, red bone marrow in admixture with blood can be harvested from the crest of the ilium or from the sternum, an intervention which is generally performed by minimal invasive surgery. Alternatively, the biological sample can be ascites, i.e. peritoneal cavity fluid, pleural effusion, aspirates from the female breast nipples, urine and other body fluids.

In another preferred embodiment, the fluid is a liquid for which the microbial burden is to be determined. For example, the liquid can be a liquid food item or a liquid pharmaceutical product which needs to be sterile, e.g. because it is formulated for intravenous administration. In such embodiments, the flow cell can be used for determining how much bacterial cells are included in the liquid. Thus, the flow cell can be used in the quality control of food items or pharmaceutical products.

When the sample to be used in the method according to the invention has a particularly high viscosity, it may be desirable to dilute it prior to or simultaneously with applying the sample to the filter element. For this purpose, any physiologically acceptable buffer may be used which does not interfere with the subsequent binding of the target cells to the affinity separation surface. Suitable buffers for the dilution of the samples are iso-osmolaric buffers which buffer within physiological pH, for example, phosphate buffered saline (PBS), Hank's balanced salt solution, Tris-buffered saline, HEPES-buffered saline, MES buffer and the like. The pH of the physiological buffer is preferably within the range of from about pH 6.0 to about 9.0, more preferably between about pH 6.5 to about 8.0, and most preferably between about pH 7.0 to about 7.5, for example 7.4.

In a still further aspect, the invention relates to a microfluidic device, comprising
(a) a microfluidic flow cell as described above, and
(b) at least one pump for conducting the fluid through the microfluidic flow cell.

The microfluidic device comprises a microfluidic flow cell as described elsewhere herein above, and, in addition, at least one pump for conducting the fluid through the channels of the microfluidic flow cell. In some cases, it may be preferable to have several pumps connected to the microfluidic device, e.g. one pump that controls the flow of the fluid and another pump for conducting washing buffer through the flow cell.

The invention further relates to the use of a microfluidic flow cell or a microfluidic device as described herein for the isolation of target particles or cells from a fluid sample. As described above, the sample can be a body fluid sample, such as a blood sample. The use of the microfluidic flow cell or device of the invention for the isolation of tumor cells from a fluid sample is preferred herein. The invention further relates to the use of a microfluidic flow cell or a microfluidic device as described herein for improving the yield of target particles or cells isolated from a fluid sample by increasing the contact between said target particles or cells with the surface comprising the affinity molecules.

In yet another aspect, the invention provides a method for the selective enrichment of target particles or cells from a fluid, comprising
(a) conducting a sample of the fluid through a microfluidic flow cell as described elsewhere herein, and
(b) subsequently separating the target particles or cells from the coated surface.

The method of the invention comprises two consecutive steps. In a first step, a sample of a fluid is conducted through the microfluidic flow cell. Normally, the flow cell has previously been washed with buffer. Preferably, the sample is a blood sample which contains or is suspected to contain tumor cells. A flow rate of between 0.1 and 5 ml/h is used, preferably between 1.0 and 5.0 ml/h. The target particles or cells will interact with the coated capture surface in the channel and adhere to the surface. Once the fluid sample has been conducted through the flow cell, the flow cell surface can be washed by flushing the flow cell with washing buffer. The washing step removes any material that has non-specifically bound to the capture surface. Subsequently, the cells can be obtained by carefully removing the cells from the capture surface. For example, the cells may be removed by carefully scraping them from the surface to which they have bound. Alternatively, individual cells can be removed by a patch clamp or the like.

In yet another aspect, the invention relates to a method for improving the yield of target particles or cells isolated from a fluid sample, said method comprising
(a) conducting a sample of the fluid through a microfluidic flow cell as described elsewhere herein, and
(b) subsequently separating the target particles or cells from the coated surface.

An exemplary microfluidic device for performing the above method is shown in FIG. 4. The device comprises the microfluidic flow cell of the invention which is connected, via its inlet and its outlet, to tubing that in turn is connected to a pump which conducts the fluid comprising the particles or cells to be isolated or enriched from a tank to the flow cell. The device in FIG. 4 further comprises a column for removing proteins from the liquid that could otherwise interfere with the binding of the tumor cells to the antibodies which are coated on the capture surface in the flow cell.

Where the fluid sample to be analyzed is a blood sample, it is preferred that red blood cells and/or platelets are removed from the sample which could otherwise interfere with binding of the target cells to the capture surface. For this purpose, the sample may be filtered through a filter element having pores, holes or apertures with a size of between 0.5 and 5 µm. Red blood cells (erythrocytes) are non-nucleated blood cells having a mean diameter of 5-8 µm which are responsible for the oxygen transport in the blood. It has been found that due to the high deformability of these cells, filter elements with a pore size of as little as 0.5 µm can effectively be used for the removal of the vast majority of these cells. Red blood cells have a flattened shape and can form tubular structures that are able to pass through apertures having a size which is significantly below the average diameter of the red blood cells in their relaxed, flattened state.

Similarly, platelets are cells without a nucleus that usually have a mean diameter of between 1-2 µm and some degree of deformability which means that they are also capable of passing through the pores of the filter elements having the above-mentioned pore size. In contrast, nucleated cells such as leukocytes or tumor cells are generally larger than 5 µm and have a limited ability to deform. Those cells will be retained by the filter element. The filtration step removes a considerable portion of the red blood cells present in the sample. Preferably, the filtration process removes about 30%, about 40%, about 50%, about 60%, about 70%, about 80%, about 90%, about 95% or even up to about 96%, about 97%, about 98%, about 99% or more of the erythrocytes which are present in the sample. The filtration step is likewise suitable to remove a considerable portion of the platelets present in the sample. Preferably, the filtration process removes about 30%, about 40%, about 50%, about 60%, about 70%, about 80%, about 90%, about 95% or even up to about 96%, about 97%, about 98%, about 99% or more of the platelets present in the sample. Nucleated cells such as leukocytes or tumor cells are retained by the filter element, so that the filtration can be used to enrich the fraction of these cells relative to red blood cells or platelets, respectively. The pore size of the filter element is between 0.5 and 5 µm, e.g. 0.5, 1, 2, 3, 4 or 5 µm. Preferably, the pore size of the filter element is between 1 and 3 µm. In this regard, the size of a particular pore is understood herein as the minimum diameter across that pore. In other words, the pore size as used herein is identical to the diameter of the largest spherical body that is still able to pass through the pore.

The filter element may comprise or consist of a woven or non-woven fabric. Filter elements made of non-woven fabrics which allow for cell separation are well known in the art, and they may consist of various materials, such as cellulose or cellulose derivatives, including, cellulose acetate, cellulose nitrate, hydroxypropyl cellulose (HPC), hydroxyethyl cellulose (HEC), hydroxybutylmethyl cellulose, hydroxypropylmethyl cellulose. Other commonly used materials for non-woven filters include, polycarbonate, hydroxyethyl starch, polysulphones, polyethersulphones, polyamides, polyether ketones, polyetherimides, polyarylenes, polyphenylene ethers, polyvinylidene fluoride (PVDF), polytetrafluorethylene (PTFE) and the like as well as glass. Non-woven filter materials can be made by various known processes, for example, meltblowing, spunbonding, air-laying, wet-forming and bonded carded web methods. Suitable non-woven filters are also available from several different suppliers, for example, from Carl Roth (Karlsruhe, Germany), Schleicher & Schuell (Dassel, Germany) and Satorius (Göttingen, Germany). Alternatively, the filter element may be a woven fabric, i.e. a material which has been prepared by a weaving process. The woven fabric for use in the present method may comprise or consist of polyamide, aromatic polyamides, polyethylene, polypropylene, polyester, polyfluorocarbon, polyacrylonitrile, polyurethane, polyacrylate, nylon, polyphenylene sulfide, polytetrafluoroethylene, polybenzimidazole, and the like. Suitable woven filters are purchasable from different suppliers.

The sample or the diluted sample can be filtered through the filter element simply by providing a pressure difference between the two sides of the filter element, with the pressure being higher at the side to which the sample is provided and at which the retentate is formed. For example, such pressure difference may advantageously be created by suitably utilizing gravity or differences in hydrostatic pressure. Depending on the specific set-up selected for the filtration, and depending on parameters of the filter element, in particular the pore or mesh size of the filter element, the skilled person will be able to adjust the pressure to be applied for conducting the sample through the filter element.

The filtration step for removing the red blood cells and/or platelets will be carried out before the sample is contacted with the flow cell of the invention. To easily incorporate such step into the overall process flow, it is possible to use ready-to-use cartridges of plastic or another suitable material which already include the tubing and other elements which are useful for the separation process. For example, a separation cartridge can be fabricated via injection molding which includes a defined plug-in position for including the flow cell as well as integrated tubing with Luer locks for connecting pumps, waste containers and the like. Similarly, a filtration cartridge can be provided with a funnel-shaped container into which the sample is injected, e.g. by a syringe. The funnel-shaped container comprises the filter element for separating off the red blood cells and/or platelets. Preferably, the filtration cartridge can be plugged on the separation cartridge such that the filtration and the subsequent separation can be performed in one process flow without intervention. A flow cell assembly containing a filtration cartridge and a separation cartridge is shown in FIGS. 6A and 6B.

BRIEF DESCRIPTION OF THE FIGURES

FIG. 2 shows three possible embodiments of the flow channel geometry within the microfluidic flow cell of the invention.

The invention is now exemplary described with reference to the enclosed figures. FIG. 1 shows an a microfluidic flow cell of the invention which comprises a top portion (1) and a bottom portion (2) which are intermateable to form at least one meander-shaped flow channel. In the embodiment shown in FIG. 1 the bottom portion is a glass slide which is coated with molecules that have affinity for the target cells or particles to be isolated or enriched. Optionally, a sealing means (9), such as a rubber ring, can be located between the top portion (1) and the bottom portion (2). When used in a microfluidic device, the top portion (1) and the bottom portion (2) of the flow cell are surrounded by upper holding means (10) and lower holding means (11) which are shaped such that they encompass and stabilize the assembly of the top portion (1) and the bottom portion (2). The top portion (1) comprises one or more flow channels etched or molded into the material of the top portion.

The flow channels can have different geometries, some of which are shown in FIG. 2. For example.

Figure 1:
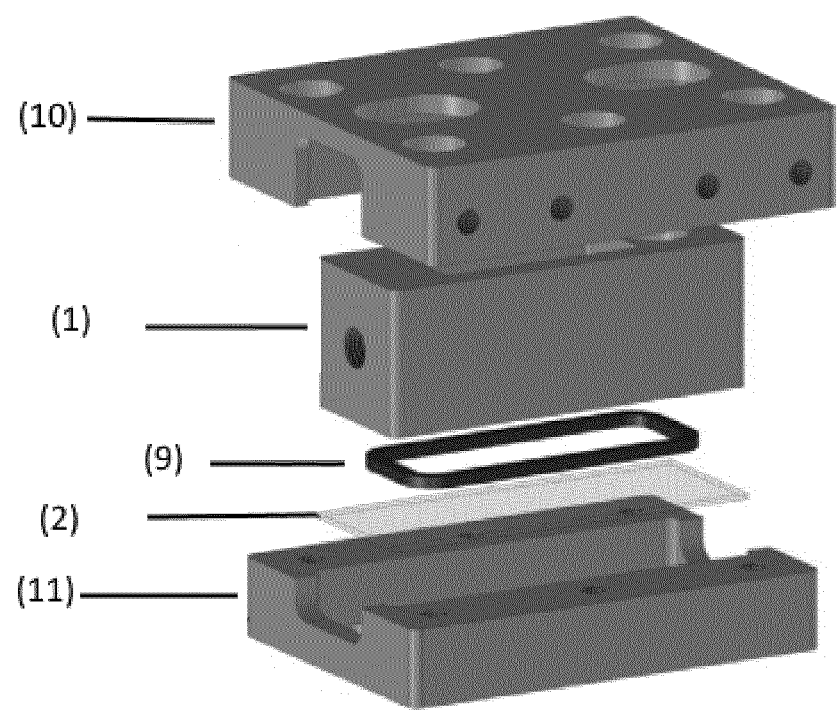
FIG. 1 shows a schematic exploration view of a microfluidic flow cell of the invention which is mounted in a corresponding holding device.
Figure 2A:
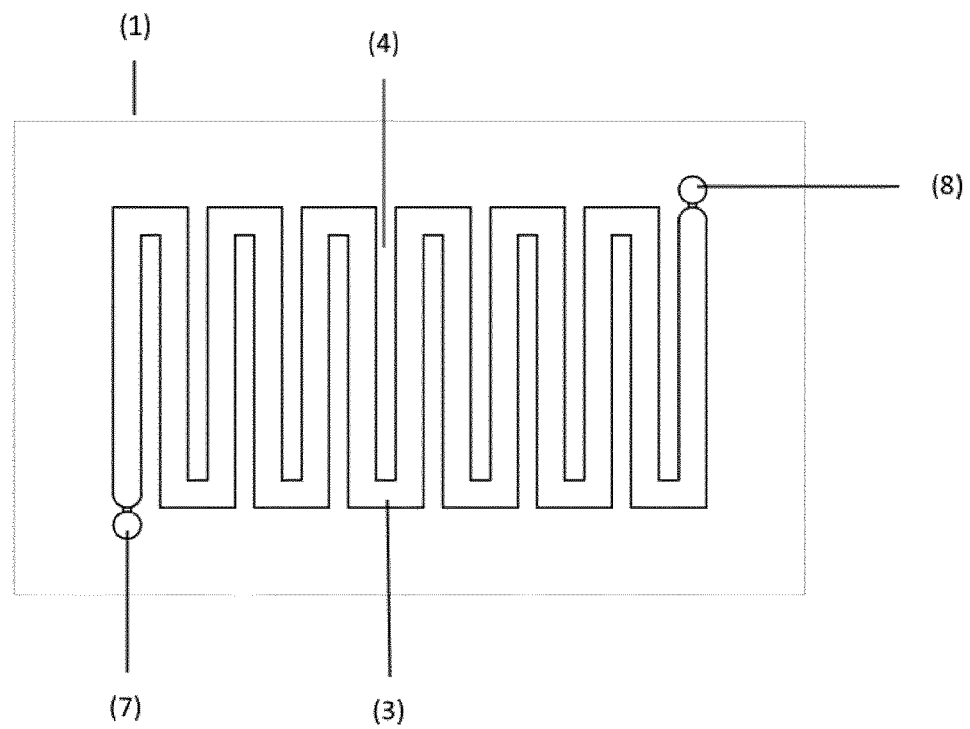
FIG. 2A depicts a top portion (1) of the flow cell of the invention comprising a flow channel (3) which is s-shaped with angular-shaped windings. The flow channel (3) is defined by a plurality of spaced interior wall portions (4) that alternatingly extend from opposite sides of the flow cell. The top portion (1) of the flow cell comprises an inlet (7) which is in fluid contact with the flow channel (3) and allows the fluid to be conducted via a pump into the top portion (1) comprising the flow channel (3). The fluid enters the flow channel (3) via the inlet (7) and leaves the flow cell via the outlet (8).
Figure 2B:
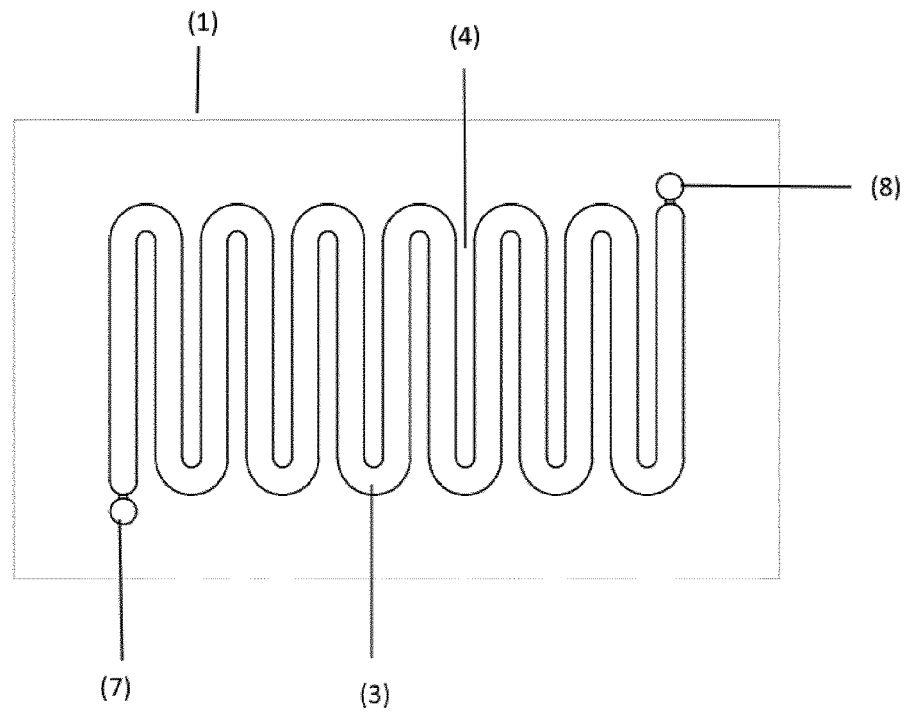
FIG. 2B depicts a top portion (1) of the flow cell of the invention comprising a flow channel (3) which is s-shaped with rounded windings.
Figure 2C:
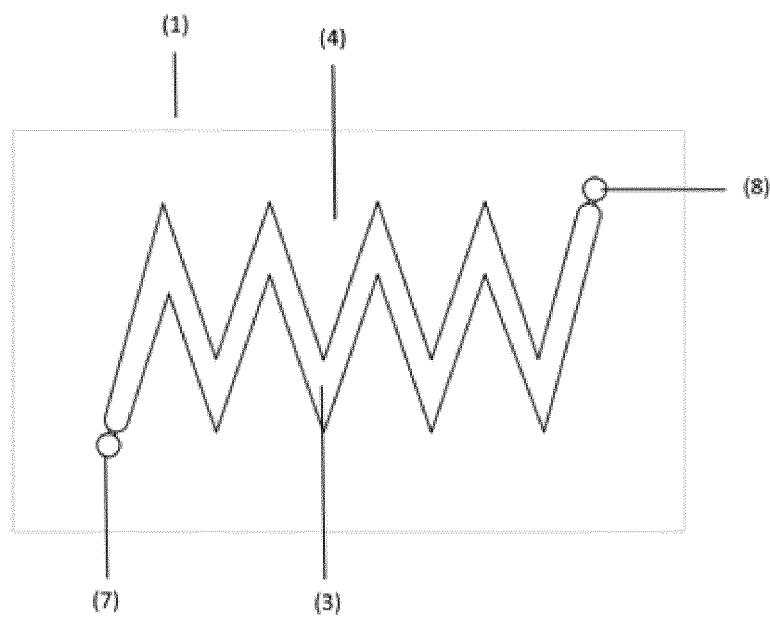
FIG. 2C depicts a top portion (1) of the flow cell of the invention comprising a flow channel (3) which is zig-zag-shaped.
Figure 3A:
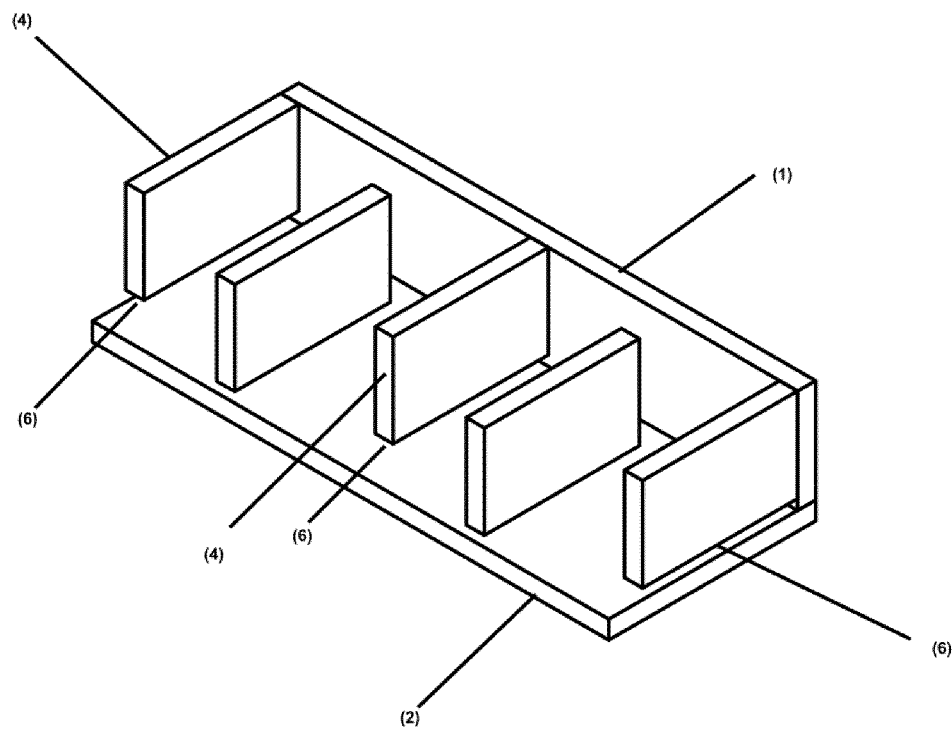
FIG. 3A shows a schematic view on an exemplary embodiment of the flow cell of the invention. The flow cell comprises a top portion (1) comprising a top plate and two side walls (the top plate and one side wall are not shown). The top portion (1) is intermateable with bottom portion (2) to form the flow channel. The bottom portion is a coated glass slide. The top portion comprises a plurality of spaced interior wall portions (4) which alternatingly extend from opposite side walls of the flow cell. By this architecture, an essentially S-shaped flow channel is formed. In this embodiment, only the interior wall portions (4) extending from the right side wall contain an opening, which is formed between the lower rim of the wall portion and the bottom plate of the flow cell. A fluid stream that is conducted through the flow cell comes into contact with the wall portion and is divided into two streams. One stream flows around the wall portion, while a second stream traverses the opening between the wall portion and the bottom plate. When the streams merge again, forces are generated which drive particles and cells towards the bottom plate.
Figure 3B:
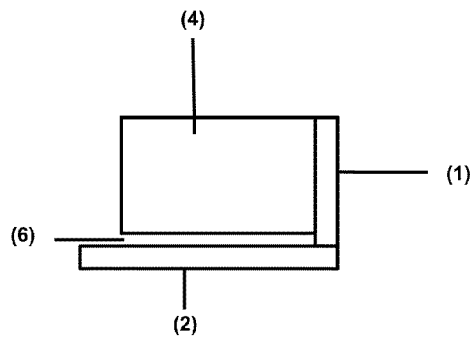
FIG. 3B shows a cross section through the flow cell of FIG. 3A. The wall portion (4) extends from the right side wall of the top portion (1) of the flow cell. The wall portion (4) is spaced from the bottom portion (2) such that opening (6) is formed.
Figure 3C:
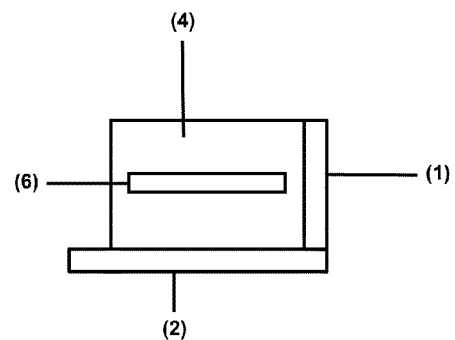
FIG. 3C shows a cross section through a cell having an alternative architecture. Here, the opening (6) is not in the form of a gap between wall portion (4) and bottom portion (2), but is in the form of a slit in the middle of wall portion (4). Still another alternative architecture of the flow cell is depicted in FIG. 3D where each of the wall portions extending into the flow channel has two openings (6), one of which has the form of a horizontal slit adjacent to bottom portion (2) and one that forms a vertical slit adjacent to the side wall of top portion (1) of the flow channel.
Figure 3D:
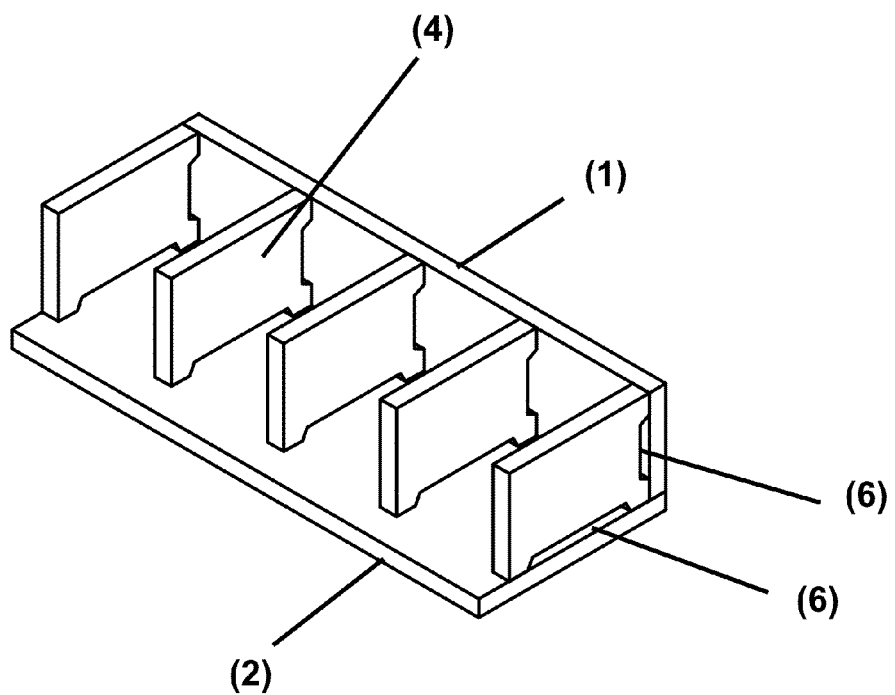
FIG. 3 shows a schematic view of different possible architectures of the flow cell of the invention.

For the separation of target cells from a sample fluid, a microfluidic flow cell with a top portion (1) as shown in FIG. 2B was used. The width of the interior wall portions was 0.5 mm, and the width of the flow channel (3) was 1.75 mm. Further, the opening between the lower rim of the interior wall portion and the bottom part of the flow cell was 40 µm. A glass slide having size of 1×3 cm was used as the bottom portion (2) of the flow cell. An O-ring (9) was used to seal the microfluidic flow cell. The general assembly of the micro fluidic flow cell used in the experiments is shown in FIG. 1. Different functionalized glass slides were used as coated capture surface. In one approach, an HC-coated slide surface was immobilized with anti-EpCAM antibodies that specifically bind to EpCAM antigens of MCF7 or HT29 cancer cells. In a different approach amino-silanized positively charged surfaces (also known as histobonds) were used which aid in the separation of cells, the latter of which are normally charged negatively. For an amino-silanized surface, a cell suspension without any further components was used in the experiments. Prior to the separation, the flow cell was washed with fresh buffer. The separation process was performed with vital MCF7 or HT29 tumor cells as well as with cells that had been previously fixed in formaldehyde. The cell suspension was pipetted into the well of an HC-coated microtiter plate and the exact cell number was counted with an optical scanner. Subsequently, the cell suspension was transferred into the microfluidic device using HC-coated pipette tips. Normally, about 1.8% of the fixed cells and about 5.8% of the vital cells are lost during the transfer. Such cell loss is due to adhesion to pipette tips or cell death, respectively. The cell suspension was introduced into the microfluidic flow cell by using a pump with a pump rate of 2 ml/hour. Tumor cells were separated by conducting the cell suspension through the flow cell. The flow cell was evaluated in an optical scanner and the cells bound to the glass slides were counted. The following results were obtained:

|  | Cell number in control value | Cell number remaining in control value | Number of cells isolated on flow cell | Recovery rate [%] minus cell loss due to pipetting |
|---|---|---|---|---|
| vital cells on amino-silanized surface | 38 | 1 | 31 | 88.6 |
|  | 36 | 4 | 29 | 96.7 |
|  | 62 | 3 | 43 | 76.8 |
|  | 115 | 10 | 87 | 87.9 |
|  |  |  |  | Average: 87.5 |
| Vital Cells on HC-Anti-EpCAM | 180 | 7 | 145 | 89.0 |
|  | 150 | 26 | 95 | 81.2 |
|  |  |  |  | Average: 85.1 |
| Fixated cells on amino-silanized surface | 42 | 4 | 38 | 100.0 |
|  | 46 | 27 | 19 | 100.0 |
|  | 55 | 24 | 26 | 86.7 |
|  |  |  |  | Average: 95.6 |
| Fixated cells on HC-Anti-EpCAM | 44 | 2 | 37 | 90.2 |
|  | 23 | 5 | 16 | 88.9 |
|  | 32 | 7 | 21 | 84.0 |
|  |  |  |  | Average: 87.7 |

Figure 5:
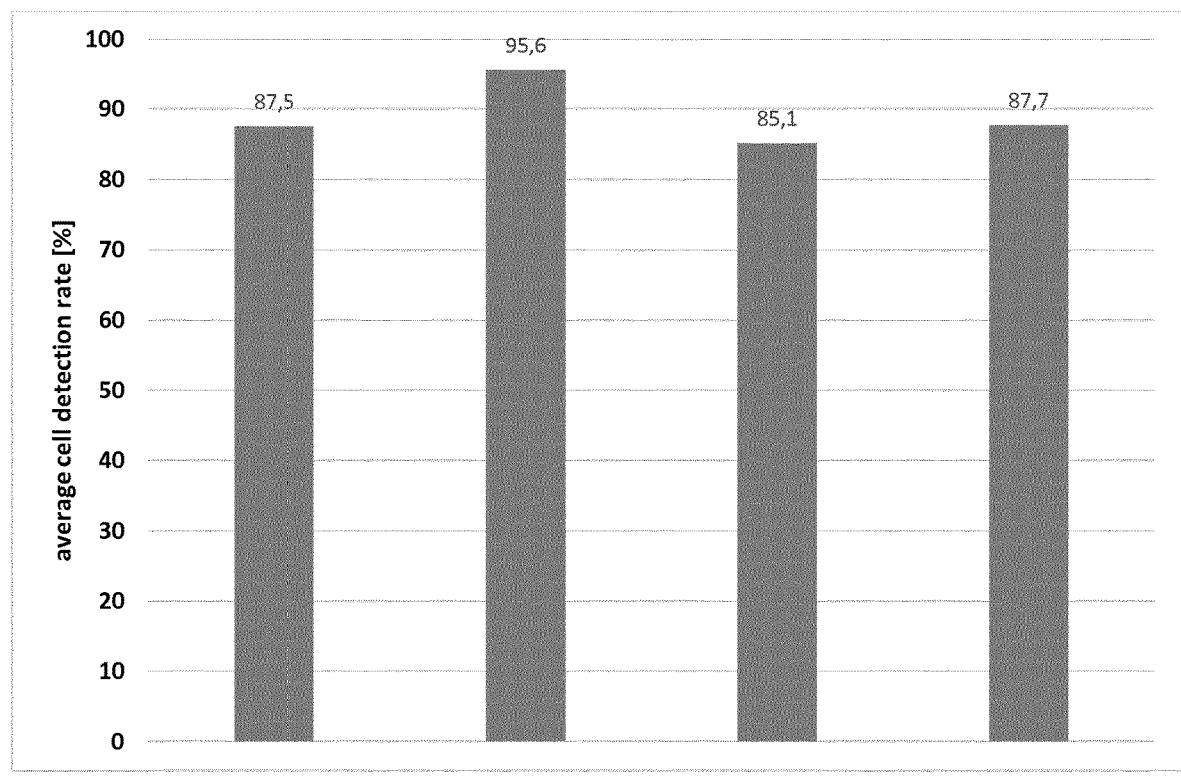
FIG. 5 shows the results of the experiments for measuring the average cell detection rates using the microfluidic flow cell of the invention. Outer left bar: recovery of vital cells on amino-silanized surfaces. Inner left bar: recovery of formaldehyde-fixed cells on amino-silanized surfaces. Inner right bar: recovery of vital cells on HC-derivatized surfaces. Outer right bar: recovery of formaldehyde-fixed cells on HC-derivatized surfaces.

It is shown in the above table that the cell detection rates using the microfluidic flow cell of the invention are very high. In particular, recovery rates of between 85-96% were achieved using the new microfluidic flow cell of the invention. The results of the cell recovery experiments are shown in FIG. 5. The outer left bar shows the results for the recovery of vital cells on amino-silanized surfaces. The inner left bar shows the results for the recovery of formaldehyde-fixed cells on amino-silanized surfaces. The inner right bar shows the results for the recovery of vital cells on HC-derivatized surfaces. The outer right bar shows the results for the recovery of formaldehyde-fixed cells on HC-derivatized surfaces.

Figure 4:
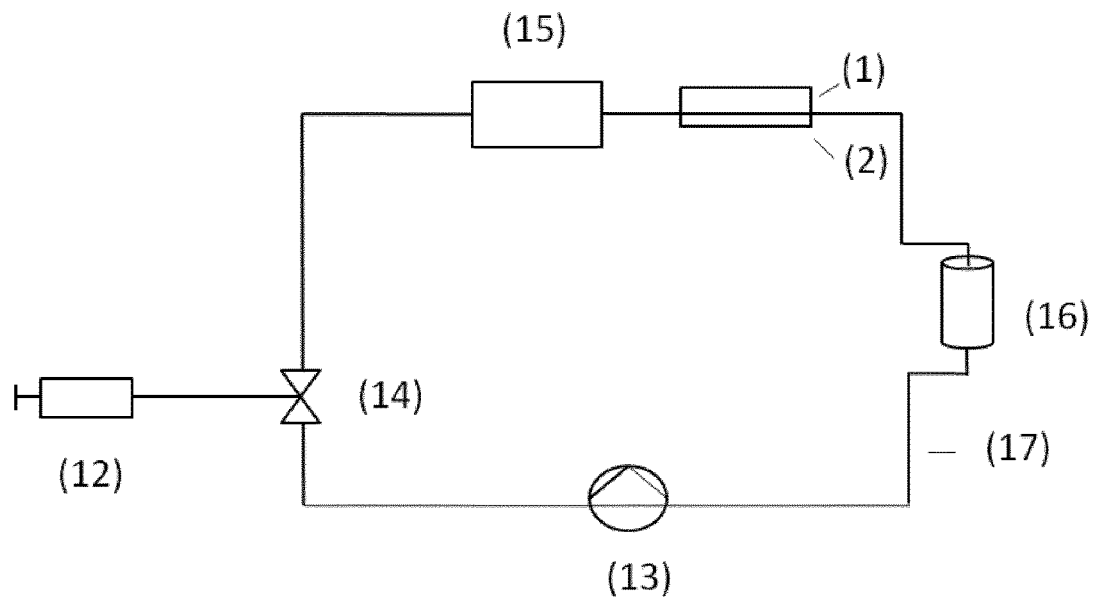
FIG. 4 shows a schematic depiction of a microfluidic device of the invention comprising the microfluidic flow cell of the invention.

FIG. 4 shows a microfluidic device of the invention that includes the novel microfluidic flow cell. The flow cell comprises a top portion (1) and a bottom portion (2) which are intermateable to form the flow channel (3). The flow cell is connected via tubing (17) to a pump (13) which conducts buffer and the sample through the microfluidic device. The fluid sample comprising the target particles or target cells is injected into the device via a valve (14) which is connected to an injection device (12). The injection device can be, e.g. a syringe that is connected to the valve via tubing. In the embodiment shown in FIG. 4, the device also comprises a purification column (15) which removes certain compounds from the sample fluid that might otherwise interfere with the processing of the sample in the flow cell. Instead of a purification column, one or more filters can be used as well. For example, filters that remove red blood cells from blood samples can be used to avoid that excessive amounts of red blood cells enter the microfluidic flow cell. The device may also comprise a waste container (16) to collect the fluid that has flown through the flow cell.

Figure 6A:
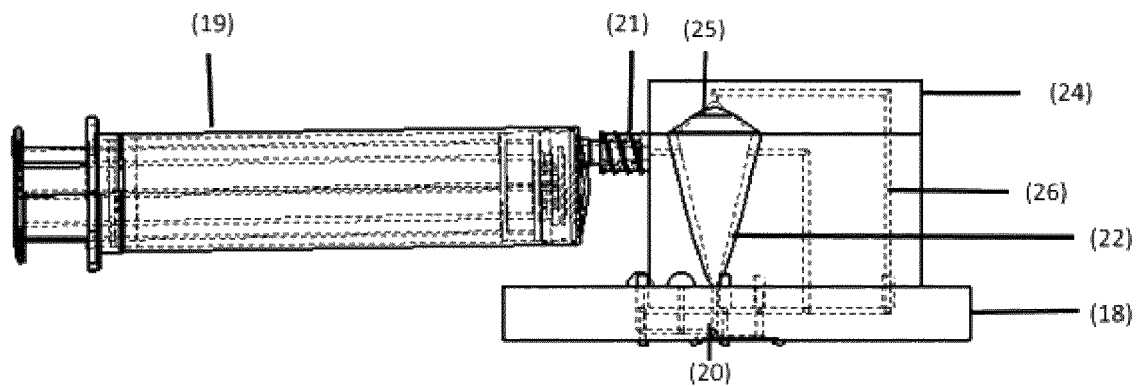
FIG. 6 shows a schematic depiction of a microfluidic device of the invention comprising a filtration cartridge and a separation cartridge.
Figure 6B:
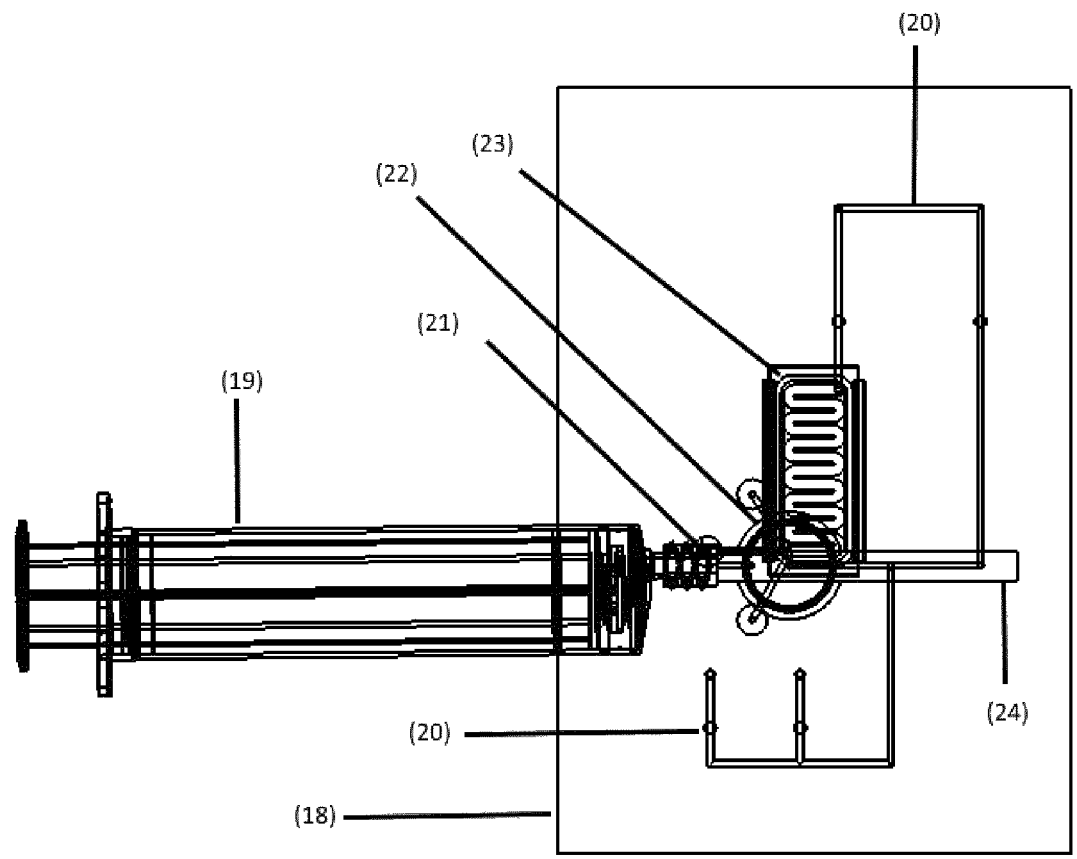

FIG. 6A shows the side view and FIG. 6B a top view of a cartridge assembly with a separation cartridge (18) and a filtration cartridge (24). The filtration cartridge (24) is plugged on the separation cartridge (18) such that the funnel-shaped receptacle (22) of the filtration cartridge (24) is vertically oriented and the separation cartridge (18) is horizontally oriented. The filtration cartridge (24) can be connected via a Luer lock (21) to a syringe (19) which is used to apply the sample fluid to the filtration cartridge (24). In a preferred embodiment, where the sample fluid is a blood sample, the funnel-shaped receptacle (22) comprises a filter element (25) in the top section of the receptacle that is connected to a waste conduit (26). The filter element (25) comprises one or more than one filters having pores, holes or apertures with a size of between 0.5 and 5 µm to allow red blood cells and platelets to pass the filter element. The blood sample is injected via an inlet into the funnel-shaped receptacle (22). The inlet is positioned in a section beneath the filter element (25). Prior to injecting the sample into the funnel-shaped receptacle (22), the filtration cartridge (24) which may already be connected to the separation cartridge (18) is turned upside down such that the filter element (25) is beneath the inlet. The blood sample is then injected into the funnel-shaped receptacle (22) and the thereby is contacted with the filter element (25). The red blood cells and platelets pass the filter element and leave the funnel-shaped receptacle (22) via the waste conduit (26). The separation can be performed by relying on gravity or it may be assisted by a pump that is connected to the waste conduit (26). The filtration cartridge (24) is held in this position for a period of time sufficient to allow the red blood cells and platelets to be separated from other cells contained in the sample and to pass the filter element (25). The red blood cells and platelets are removed from the receptacle (22) and are conducted through conduit (26) into a waste container. After removal of the red blood cells and platelets, the filtration cartridge (24) is turned into the correct position again, and the sample which is now depleted for red blood cells and platelets is processed by conducting it via tubing (20) to the separation cartridge (18) and into flow cell (23). In the flow cell (23), the particles are captured and immobilized onto the surface coated with the respective affinity molecules.

The invention claimed is:

1. Microfluidic flow cell for the selective enrichment or isolation of target particles or target cells from a fluid comprising a top portion (1) and a bottom portion (2) which are intermateable to form at least one meander-shaped flow channel (3) for conducting the fluid through the flow cell, wherein said meander-shaped flow channel (3) is defined by a plurality of spaced interior wall portions (4) alternatingly extending from opposite sides of the flow cell, wherein the flow channel (3) comprises at least one surface which is coated with molecules having affinity for the target particles or cells, characterized in that one or more of the interior wall portions (4) comprises at least one opening (6) to allow a portion of a fluid stream flowing along the flow channel (3) to traverse said wall portion (4).

2. Microfluidic flow cell according to claim 1, wherein the flow cell has a plurality of flow channels (3).

3. Microfluidic flow cell according to claim 1, wherein the flow cell consists of glass, plastic, silicon or polydimethylsiloxane (PDMS).

4. Microfluidic flow cell according to claim 1, wherein the at least one surface is coated with antibodies or aptamers.

5. Microfluidic flow cell according to claim 1, wherein the flow cell comprises at least one inlet (7) and at least one outlet (8).

6. Microfluidic flow cell according to claim 1, wherein said meander-shaped flow channel (3) has a width of 0.9 to 1.8 mm.

7. Microfluidic flow cell according to claim 1, wherein the opening is a slit having a width of about 10-100 μm.

8. Microfluidic flow cell according to claim 1, wherein the flow cell is ≤2 cm wide and/or ≤5 cm long.

9. Microfluidic flow cell according to claim 1, wherein the meander-shaped flow channel (3) has a height of about 100-300 μm.

10. Microfluidic flow cell according to claim 1, which is fluidly connected to a vertically oriented filtration cartridge (24), said filtration cartridge (24) comprising a funnel-shaped receptacle (22) which comprises a filter element (25) in the top section of the receptacle that is connected to a waste conduit (26), and said filtration cartridge (24) further comprising an inlet for conducting a fluid sample into said funnel-shaped receptacle (22).

11. Microfluidic flow cell according to claim 2, wherein the flow cell has 2-50 flow channels (3).

12. Microfluidic flow cell according to claim 1, wherein the at least one surface is coated with antibodies or aptamers that specifically bind to tumor cells.

13. Microfluidic flow cell according to claim 1, wherein the opening is a slit having a width of about 20-50 μm.

* * * * *